United States Patent [19]
Doane et al.

[11] Patent Number: 5,093,735
[45] Date of Patent: Mar. 3, 1992

[54] INFRARED MODULATING MATERIAL COMPRISING A LIQUID CRYSTAL AND A MEDIUM

[75] Inventors: J. William Doane, Kent; John L. West, Monroe Falls, both of Ohio

[73] Assignee: Kent State University, Kent, Ohio

[21] Appl. No.: 582,239

[22] Filed: Sep. 13, 1990

[51] Int. Cl.[5] .............................................. G02F 1/13
[52] U.S. Cl. ....................................... 359/52; 359/43; 359/99
[58] Field of Search ........... 350/350 R, 347 V, 347 E, 350/351, 349; 252/299.01

[56] References Cited

U.S. PATENT DOCUMENTS

| | | | |
|---|---|---|---|
| 3,585,381 | 6/1971 | Hodson et al. | 350/351 |
| 3,600,060 | 8/1971 | Churchill et al. | 350/351 |
| 3,620,889 | 11/1971 | Baltzer | 350/351 |
| 3,795,529 | 3/1974 | Cartmell et al. | 350/351 |
| 3,816,786 | 6/1974 | Churchill et al. | 350/351 |
| 3,852,092 | 12/1974 | Patterson | 350/347 V |
| 3,872,050 | 3/1975 | Benton et al. | 350/347 V |
| 3,885,982 | 5/1975 | Fergason | 350/350 R |
| 3,935,337 | 1/1976 | Taylor | 350/350 R |
| 3,969,264 | 7/1976 | Davis | 350/350 R |
| 4,022,706 | 5/1977 | Davis | 350/350 R |
| 4,048,358 | 9/1977 | Shanks | 428/1 |
| 4,070,902 | 1/1978 | McNaughton | 73/356 |
| 4,101,207 | 7/1978 | Taylor | 350/344 |
| 4,114,991 | 9/1978 | Bleha, Jr. et al. | 350/347 V X |
| 4,161,557 | 7/1979 | Suzuki et al. | 428/1 |
| 4,310,577 | 1/1982 | Davison et al. | 428/1 |
| 4,435,047 | 3/1984 | Fergason | 350/334 |
| 4,596,445 | 6/1986 | Fergason | 350/339 F |
| 4,601,545 | 7/1986 | Kern | 350/347 V |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,699,468 | 10/1987 | Harasim et al. | 350/332 |
| 4,728,547 | 3/1988 | Vaz et al. | 428/1 |
| 4,765,719 | 8/1988 | Fergason | 350/347 V X |
| 4,850,683 | 7/1989 | Kawaguchi et al. | 350/350 R |
| 4,869,897 | 9/1989 | Leslie et al. | 252/299.01 |
| 4,890,902 | 1/1990 | Doane et al. | 350/347 V |
| 4,891,152 | 1/1990 | Miller et al. | 252/299.01 |

FOREIGN PATENT DOCUMENTS

| | | |
|---|---|---|
| 4208972 | 11/1973 | Australia . |
| 156615 | 11/1985 | European Pat. Off. . |
| 313053 | 4/1989 | European Pat. Off. . |
| 55-96922 | 7/1980 | Japan . |
| US8500397 | 9/1985 | PCT Int'l Appl. . |
| US8601927 | 3/1987 | PCT Int'l Appl. . |
| 1540878 | 2/1976 | United Kingdom . |
| 1442360 | 7/1976 | United Kingdom . |

OTHER PUBLICATIONS

Le Roy et al., Phyisque Crystalline—Effets de Champ Magnetique..., Series B, vol. 274, pp. 419–422, 2/7/72.
Craighead et al., New Display Based on Electrically Induced Index... Appl. Phys. Lett., vol. 40, No. 1, 1-1-82.
Drzaic, Polymer Dispersed Liquid Crystal for Large Area Displays & Light Values, J. Appl. Phys., vol. 60, pp. 2142–2148, 1986.
West, Phase Separation of Liquid Crystals in Polymers, Mol. Cryst... vol. 157, pp. 427–441, Apr. 1988.
Wu et al., Potential Infrared Liquid Crystals, Liquid Crystals, vol. 5, pp. 1415–1424, 1989.

Primary Examiner—Stanley D. Miller
Assistant Examiner—Huy K. Mai
Attorney, Agent, or Firm—Watts Hoffmann Fisher & Heinke

[57] ABSTRACT

An infrared modulating material comprising a first infrared transmissive phase dispersed in a second infrared transmissive phase. One of the phases comprises a liquid crystal phase and the other comprises a medium phase. The liquid crystal phase has an ordinary index of refraction for infrared radiation matched to an index of refraction of the medium for infrared radiation so that infrared radiation is scattered by the material in the absence of an external field and transmitted in the presence of an external field. In addition, the dispersed first phase has a feature size matched to a range of wavelengths of infrared radiation to be modulated so as to enhance the scattering of the radiation by the material in the absence of an applied field.

25 Claims, 5 Drawing Sheets

FIELD OFF SCATTERING

FIELD OFF TRANSPARENT

FIG. 3A FIELD ON TRANSPARENT
FIG. 3B FIELD OFF SCATTERING
FIG. 4A FIELD ON TRANSPARENT
FIG. 4B FIELD OFF SCATTERING

INFRARED MODULATING MATERIAL COMPRISING A LIQUID CRYSTAL AND A MEDIUM

FIELD OF THE INVENTION

The present invention relates generally to liquid crystal technology, and more specifically to the manufacture of novel infrared modulating material comprising an infrared transmissive liquid crystal and an infrared transmissive medium.

BACKGROUND OF THE INVENTION

"Infrared radiation" ("IR") refers to electromagnetic radiation having a wavelength longer than that of visible light. IR is associated with the radiation of heat. All bodies over absolute zero emit infrared radiation and the intensity increases monotonically with temperature.

Infrared images of radiant thermal energy can be used for diagnostic or comparative analysis. If the "normal" temperature characteristics of an object can be determined in relative or absolute terms, then abnormalities can be detected through infrared imaging. Among the uses for IR imaging devices are quality control inspections and preventive maintenance on industrial parts, remote sensing, surveillance and medical diagnosis.

Infrared video devices create a thermal image of an object by detecting and displaying relative intensities of infrared radiation emitted by the object, which then yields a measure of the temperature distribution. Because the imaging system responds only to changes in temperature, the infrared radiation reaching the detector from the object must be modulated to produce temperature differentials which may then be processed to determine absolute or relative temperature distribution.

One technique for modulating infrared radiation emitted by an object is to scan the object with a detector, either by moving the detector relative to a fixed object or by moving the object relative to a fixed detector. The detector then measures the differences between the temperatures of consecutive fields of vision, which differences may be processed to generate a thermal image.

Alternatively, both the object and the detector can remain stationary and the radiation may be modulated with a chopper that creates temperature differentials by alternately blocking and transmitting the incident radiation image. The chopper modulates the incident radiation so that the incident radiation periodically changes.

Mechanical choppers have several disadvantages. For example, portable choppers are battery operated and consume large amounts of power. Replacement battery packs are bulky and heavy, and limit the use of IR imaging in the field. In addition, choppers are noisy and mechanically complex so that they are prone to breakdown.

DISCLOSURE OF THE INVENTION

The present invention overcomes the disadvantages of scanning systems and mechanical choppers by providing a novel infrared modulating material, i.e., an IR shutter, comprised of a dispersion of a first infrared transmissive phase in a second infrared transmissive phase. One of the phases comprises a liquid crystal phase and the other phase comprises a medium phase.

Since the infrared spectrum covers several orders of magnitude of wavelengths, it is more practical to select a liquid crystal phase and a medium phase which are transparent to infrared radiation (i.e., absorb no more than 50% of incident infrared radiation) in a narrower range of wavelengths in the infrared spectrum than to attempt to find phases which are substantially non-absorptive over the entire infrared range. In a preferred embodiment of the invention, the material is designed to modulate infrared radiation having wavelengths in one or more of the 2.5 $\mu$m–5 $\mu$m, 8 $\mu$m–14 $\mu$m or 15 $\mu$m–30 $\mu$m wavelength ranges. The ordinary index of refraction of the liquid crystal measured in the selected range of wavelength is matched to the index of refraction of the medium measured in the same range so that radiation is transmitted when the optic axis of the liquid crystal phase is aligned parallel to the direction of propagation of the incident radiation by an external field. Furthermore, either the liquid crystal phase or the medium phase has a feature size (i.e., a characteristic dimension) on the order of the selected range of wavelengths so that the material scatters infrared radiation in the absence of an external electric or magnetic field.

The material is manufactured for a specific wavelength range by choosing a medium phase and a liquid crystal phase which are at least 50%, and preferably at least 80%, transparent to incident infrared radiation in the specific wavelength range and for which the ordinary index of refraction of the liquid crystal measured in the selected range matches an index of refraction of the medium measured in that range. A dispersion is then formed of the liquid crystal phase and medium phase. Depending on the nature of the medium and the liquid crystal and the relative proportions of the phases, the dispersion may be free standing or may require a containment structure such as infrared transparent substrates surrounding the suspension.

According to another feature of the invention, the material should be responsive when electrically or magnetically addressed. In the absence of an applied electric or magnetic field, the domain directors of the liquid crystal phase are randomly oriented so that electromagnetic radiation is scattered by the dispersion. The application of a suitable constant or time-varying electric or magnetic field aligns the directors of the liquid crystal phase so that infrared radiation is transmitted through the dispersion.

One application of the infrared modulating material is for modulating infrared radiation emitted by an object prior to detection by an infrared detector. When used as a modulator, the infrared material is less costly, more reliable, less noisy, simpler in design and requires less power than a mechanical chopper.

According to a feature of the invention, the liquid crystal phase is nematic and has a positive dielectric anisotropy. Preferred liquid crystals include cyanobiphenyl derivatives due to their high dielectric anisotropy and birefringence. An especially preferred liquid crystal material is a mixture of cyanobiphenyl liquid crystals sold under the trade name E7 by EM Chemicals. Other liquid crystals which may be desirable for certain applications of the infrared modulating material include cyclohexane derivatives and cyanotolanes, which have low infrared absorption but which also have low dielectric anisotropies and require greater switching voltages. The liquid crystal may be perdeuterated to decrease IR absorption in the working frequency range of the material by shifting the C—H bond resonance outside the working frequency range.

The dispersion of the two phases may take many forms. According to one embodiment, the liquid crystal phase comprises droplets dispersed in a polymer matrix. When the dispersion takes the form of droplets of liquid crystal in a polymer matrix, the feature size is the diameter of the droplets.

In an especially preferred embodiment, the dispersion may be produced by forming a homogeneous solution of the liquid crystal with a resin, i.e., a polymer or a polymer precursor (alone or in a solvent), and then solidifying the polymer or polymer precursor to form a matrix. The resulting material comprises a polymer matrix phase plasticized with a small amount of liquid crystal and droplets of a liquid crystal phase which separate spontaneously from solution with the resin during solidification. The droplet size is controlled to obtain droplets with diameters matched to the working range of wavelengths by controlling certain variables during the manufacture of the material, such as the composition of the resin, the concentrations of the liquid crystal and the resin in the solution and the rate of solidification of the resin. According to another especially preferred embodiment of the invention, the material is mechanically deformed, either by compression or stretching, to deform the droplets from a spherical shape in order to decrease the switching time. Two preferred resins for the matrix are polyvinyl pyrrolidone and polymethylmethacrylate. This method of forming a modulating material, commonly referred to as "polymer dispersed liquid crystal" ("PDLC"), is discussed further in U.S. Pat. Nos. 4,671,618 to Wu et al.; 4,673,255 to West et al.; 4,685,771 to West et al.; and 4,688,900 to Doane et al., each of which is assigned to the assignee of the present application and the disclosures of which are incorporated herein by reference.

The resin may be cross-linked in order to inhibit the liquid crystal from dissolving back into the matrix and to seal in the size and shape of the droplets.

The resin may be either optically isotropic or birefringent, e.g., a liquid crystalline polymer. When a liquid crystalline polymer is used in forming the matrix, the ordinary and extraordinary indices of refraction of the liquid crystal phase are matched to the ordinary and extraordinary refractive indices of the liquid crystalline polymer to form a "haze-free" material with a widened field of transmission. Such "haze-free" materials are described in further detail in U.S. patent application Ser. No. 07/324,051, filed Mar. 20, 1989, now U.S. Pat. No. 4,994,204 and assigned to the assignee of the present application, the disclosure of which is incorporated herein by reference.

An alternative technique for forming droplets of liquid crstal phase in a polymer matrix is to form an emulsion of said liquid crystal phase with a resin emulsifying agent and at least partially solidifying the resin to encapsulate droplets of the liquid crystal phase in polymer capsules. The polymer matrix itself may be formed either by casting the emulsion on a substrate transparent to infrared radiation to form a film of capsules surrounded by solidified resin or by separating the capsules from the emulsion and adhering the capsules to the substrate by means of a binder transparent to infrared radiation. A preferred resin emulsifying agent is polyvinyl alcohol. Materials comprising nematic liquid crystal formed in an aqueous emulsion and encapsulated in a resin used as an emulsifying agent, occasionally referred to as "nematic curvilinear aligned phase" ("NCAP"), are discussed further in P. Drzaic, "Polymer Dispersed Nematic Liquid Crystal [sic] for Large Area Displays and Light Valves," *Journal of Applied Physics*, vol. 60, no. 6, pages 2142-2148 (Sept. 15, 1986).

According to another embodiment, the material may comprise particles of a solid medium dispersed in a layer of liquid crystal. When the material comprises solid particles dispersed in liquid crystal, the feature size is the diameter or a characteristic length of the particles. In an especially preferred embodiment, the liquid crystal is enclosed between two substrates transparent to infrared radiation. The particles may comprise polymer beads or particles of a polymer such as polyvinyl pyrrolidone, polymethylmethacrylate or polytetrafluoroethylene; an alkyl halide such as sodium chloride, calcium chloride, cesium chloride, potassium chloride or potassium bromide; or glass. While, in a preferred embodiment, the molecules of liquid crystal are randomly aligned in the absence of an external electric or magnetic field, a nematic liquid crystal which aligns parallel to an electric or magnetic field in a field-on state may be aligned in a field-off state with its optical axis out of parallel with the direction of incident radiation, e.g., parallel to the substrates, such as by rubbing the inner surfaces of the substrates. Modulating materials formed from a dispersion of solid particles in a layer of liquid crystal are discussed in further detail in British Provisional Specifications No. 1,442,360 to Hilsum and 1,540,878 to Mash et al.

In yet another embodiment, the material comprises a liquid crystal phase imbibed and sealed into pores in a porous solid. In this structure, the feature size is the width of the pores. One example of a suitable porous solid is a Millipore filter, which is commercially available with pore diameters ranging from 1 to 15 $\mu$m. A suitable polymer for use in forming a porous solid for use in an infrared modulating material is polytetrafluoroethylene, sold under the trade name TEFLON TM.

According to one technique, the liquid crystal is imbibed into the porous solid by covering the surface of the solid with the liquid crystal and allowing the pores to fill by capillary action. Alternatively, the porous solid is placed on a glass frit and covered with liquid crystal. A slight pressure differential is applied across the glass frit to draw the liquid crystal down into the pores. Once imbibed into the pores, the liquid crystal may be sealed in the porous solid by sandwiching the porous solid between substrates transparent to infrared radiation. Modulating materials formed by imbibing liquid crystal into porous solids are discussed in further detail in H. Craighead, "New Display Based on Electrically Induced Index Matching in an Inhomogeneous Medium," *Applied Physics Letters*, vol. 40, no. 1, pages 22-24 (Jan. 1, 1982).

According to a preferred embodiment of the invention, a feature size of the material, such as liquid crystal droplet size in a solid matrix or pore size in a porous solid imbibed with liquid crystal, is on the order of the working range of wavelengths of the modulating material. Preferably, the feature size is chosen so as to maximize scattering of radiation in the working range of wavelengths in the absence of an external electrical or magnetic field. The feature size which maximizes scattering will not necessarily fall within the working range of wavelengths for all modulating materials.

It should be noted that the invention is not limited to materials in which the dispersed phase has substantially a uniform feature size. For example, it may be desirable in forming a material comprising droplets of liquid crystal dispersed in a solid matrix to use a distribution of droplet sizes rather than droplets which are of substantially the same size. In either case, however, the feature sizes should all be chosen so as to be on the order of the wavelengths of radiation to be modulated by the material.

A preferred IR shutter making use of the infrared modulating material of the invention comprises an infrared modulating material formed according to the invention, an electrode for applying an external electric field across the material for switching the material between infrared scattering and infrared transmissive conditions and a power supply electrically coupled to the electrode for generating and transferring to the electrode electric power for applying such an electric field. The details of the electrode configuration and the power supply will depend on the application for which the IR shutter is designed.

The various features and advantages of the invention will become more apparent from the following detailed description of preferred embodiments of the invention when considered along with the accompanying drawings.

BEST MODE FOR CARRYING OUT THE INVENTION

Referring now to the drawings, FIGS. 1-4 illustrate different infrared modulating materials embodying the present invention. Each of the figures marked "A" shows the response of a material embodying the invention to an external electric field and each of the figures marked "B" illustrates the same material in a field-off state. In each of these drawings, "$I_o$" designates the direction of incident radiation and "$I_t$," the direction of transmitted radiation.

As indicated in FIGS. 1-4, the material of the invention preferably scatters a working range of wavelengths of infrared radiation in a field-off state (shown schematically in the figures marked "B") and transmits infrared radiation in the working range in a field-on state (shown schematically in the figures marked "A"). In each embodiment shown, liquid crystal and a medium are interspersed. For the case of an optically isotropic medium, the ordinary index of refraction of the liquid crystal in the working range of infrared radiation is matched to the index of refraction of the medium in the same range of wavelengths. A feature size, such as the diameter of dispersed solid particles or liquid crystal droplets or pore sizes of porous solids, is matched to the wavelength of infrared radiation to be scattered in the field-off state of the material in order to enhance the degree of infrared scattering of the material in a field-off state.

The infrared modulating material of the invention is formed by combining a liquid crystal and a medium to form a dispersion having a feature size of about the size of the infrared radiation to be modulated. The dispersion may take a number of forms. The material may comprise droplets of liquid crystal in a polymer matrix (FIGS. 1A and 1B), solid infrared transmissive particles dispersed in a layer of liquid crystal (FIGS. 2A and 2B), liquid crystal imbibed into the pores of a porous infrared transmissive solid (FIGS. 3A and 3B) or liquid crystal encapsulated in polymer capsules which are bound to a substrate to form and infrared modulating film (FIGS. 4A and 4B). In each of the embodiments shown in FIGS. 1-4, the liquid crystal is preferably nematic with positive dielectric anisotropy, though the invention is not limited to the use of purely nematic liquid crystals. Depending on the application, the medium may be a polymer, an alkyl halide, an alkyline earth halide or glass.

Preferred liquid crystals for use in infrared modulating materials embodying the invention include liquid crystals of the nematic type which have large positive dielectric anisotropy and birefringence and are transparent in the 2.5-5 μm, 8-14 μm or 15-30 μm range. One particularly preferred liquid crystal for use in materials embodying the invention is marketed under the trade name E7 by EM Chemicals and is a mixture consisting of (by weight) 4'-n-pentyl-n-cyano-biphenyl, 51%; 4'-n-heptyl-n-cyano-biphenyl, 21%; 4'-n-octoxy-4-cyano-biphenyl, 16% and 4'-n-pentyl-4-cyano-terphenyl, 12%, which has a weak absorption at 8.5 μm, a weak absorption at 10 μm, and a moderate absorption at 12.5 μm. A thin film (26 μm) of material containing E7 has an integrated transmission over the 8-14 μm region of greater than 80% and would therefore be considered highly transparent to infrared radiation.

It is possible to reduce the infrared absorption of the liquid crystals by utilizing nonaromatic materials. CM-1664 (EM Chemicals) is a nonconjugated liquid crystal based on cyclohexanes and has a broad infrared transmission window. One drawback to the use of liquid crystals based on cyclohexanes is low dielectric anisotropy, so that a relatively large electric field is required to align the directors into a field-on configuration. Other liquid crystals useful in the invention include cyanotolanes.

One alternative for reducing the infrared absorption of an infrared modulating material having a narrow working range of frequencies is to deuterate the liquid crystal used to form the liquid crystal phase in the material. Perdeuteration, the substitution of deuterium ions for hydrogen ions, shifts the C—H bond resonance by a factor of $\sqrt{2}$. If the liquid crystal has a high absorption band in the working range of frequencies of the modulating material, deuterating the liquid crystal may shift the absorption band out of the working range of frequencies and thereby reduce the absorption of the liquid crystal.

A preferred material for use as a medium is a polymer resin. In particular, it is desirable to choose a polymer having a low absorption for infrared radiation in the 2.5-5 μm, 8-14 μm or 15-30 μm range. Useful polymers having low infrared absorption in these ranges include polyvinylidine and polystyrene materials. Particular resins for use as media include polyvinyl pyrrolidone, polymethylmethacrylate and polytetrafluoroethylene. Standard epoxy resins can be utilized in the 2.5-5 μm range. Non-aromatic polymers may be chosen for transparency in the 2.5-5 μm and 8-14 μm ranges.

According to one embodiment of the invention, the medium may be a birefringent polymer such as a liquid crystal side-chain polymer. If the medium is a birefringent polymer, the polymer should be chosen such that the ordinary and extraordinary indices of refraction of the liquid crystal match the ordinary and extraordinary indices of refraction of the polymer. Matching both refractive indices of the liquid crystal to refractive indices of the medium decreases the "haze," and the temperature dependence of the transmission of radiation through the material.

Figure 1A:
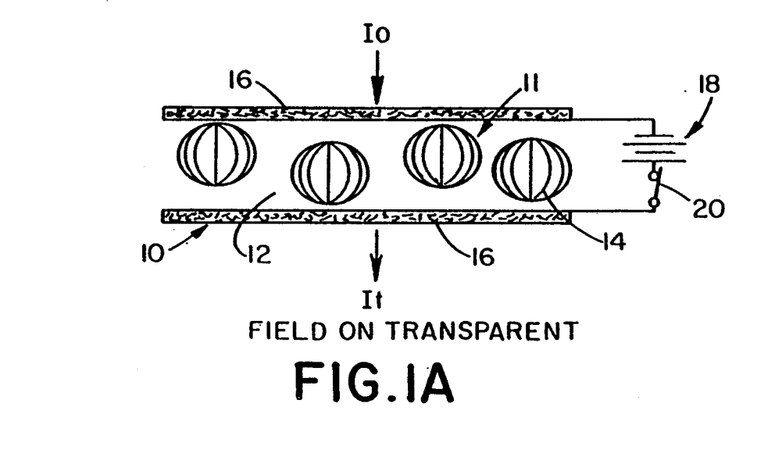
FIG. 1A is a fragmentary, schematic view in cross-section of polymer dispersed liquid crystal infrared modulating material embodying the present invention in a field-on state.

FIG. 1A shows a device 10 incorporating an infrared modulating material 11 embodying the present invention. The material 11 consists of a dispersion of liquid crystal droplets 14 dispersed in a polymer matrix 12. Preferably, the droplets 14 have diameters of the same length as the wavelength of the infrared radiation to be scattered in the field-off state.

The material 11 is sandwiched between electrodes 16 both of which are transparent in the wavelength range of infrared radiation to be modulated. In a field-on state, a power supply 18 is coupled to the conductors 16 by a closed switch 20. As the electrodes 16 charge, an electric field is applied across the material 11. When a liquid crystal with positive dielectric anisotropy is used in the droplets 14, the field generated by the electrodes 16 aligns the optical axes of the liquid crystal droplets 14 parallel to the field so that the material 11 transmits incident radiation $I_o$ without significant scattering.

Figure 1B:
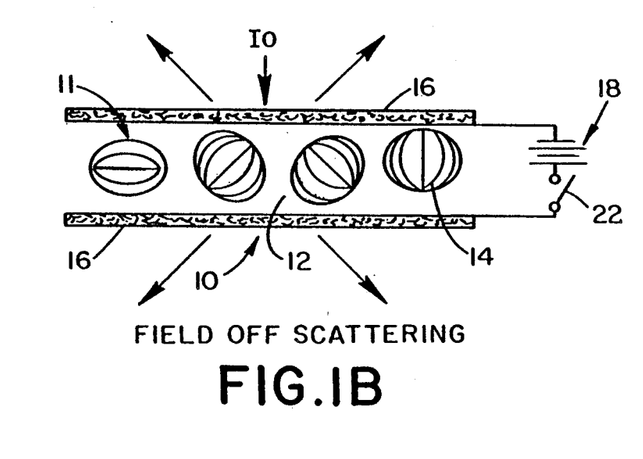
FIG. 1B is a fragmentary, schematic view in cross-section of the liquid crystal infrared modulating material illustrated in FIG. 1A in a field-off state.

FIG. 1B shows the same device 10 in a field-off state when the power supply 18 is decoupled from the electrodes 16 by an open switch 22. Absent an external field, the optical axes of the droplets 14 are randomly aligned so that the material 11 scatters incident radiation.

The material described in FIGS. 1A and 1B may be prepared by phase separation techniques from a homogeneous solution of the liquid crystal and a polymer or polymer precursor so as to form droplets 14 of liquid crystal in a polymer-rich matrix 12. There are three basic phase separation techniques which can be utilized: temperature induced phase separation ("TIPS"), solvent induced phase separation ("SIPS") and polymerization induced phase separation ("PIPS").

An important feature of an infrared modulating material embodying the invention is that the dispersed phase, here the liquid crystal droplets 14, have a feature size which is of the order of the working range of wavelengths modulated by the material. Therefore, it important in forming an infrared modulating material by phase separation to control the droplet size so that the diameters of the droplets 14 match the wavelength of radiation to be scattered.

A preferred technique for synthesizing an infrared modulating material is a combination of the SIPS and TIPS processes. The resin and liquid crystal are dissolved in a solvent such as chloroform. The solvent is then removed from the three-way solution of resin, liquid crystal and solvent to induce solidification of the resin and formation of liquid crystal droplets 14. The resulting material comprises droplets of a liquid crystal phase 14 dispered in a matrix 12 composed of a resin-rich phase plasticized with the liquid crystal.

In order to adjust the droplet size, the solidified material is reheated so that the material returns to a single-phase solution of liquid crystal and resin. When the material is once again cooled, the liquid crystal again phase separates from solution with the resin into droplets 14. The rate of growth of the droplets 14 and the ultimate droplet size may regulated by controlling the nature of the resin and the liquid crystal, the proportions of the resin and liquid crystal and cooling rate of the reheated material. A low concentration of liquid crystal and a rapid rate of cooling yield smaller droplets while higher concentrations of liquid crystal and slower cooling rates yield larger droplets.

According to another embodiment of the invention, the matrix may be cross-linked to inhibit the liquid crystal from dissolving back into the matrix and to seal in the size and shape of the droplets.

Preferred resins for use in forming the resin matrix include polyvinyl pyrrolidone and polymethylmethacrylate, which are transparent in the 2.5 μm-5 μm, 8 μm-14 μm and 15 μm-30 μm wavelength ranges and are miscible with E7 nematic liquid crystal in a suitable solvent such as chloroform. On the other hand, polytetrafluoroethylene is an example of a material which would not be suitable for use as a resin in the SIPS, TIPS or PIPS methods despite transparency in the 2.5 $\mu$m-5 $\mu$m, 8 $\mu$m-14 $\mu$m and 15 $\mu$m-30 $\mu$m wavelength ranges since polytetrafluoroethylene is not soluble with E7 or in a convenient solvent.

The infrared material is sandwiched between substrates. The substrates must also have broad transmissive windows within the desired infrared regions to be modulated. Suitable substrates are germanium, silicon and platinum coated sodium chloride and zinc selenide. Germanium substrates, for example, are relatively transparent to IR. Spectra of 2 mm thick substrates show about 50% transmission in the IR. It appears that the low transmission is due to reflection rather than absorption and that the transmission may therefore be increased with proper antireflective coatings on the substrates.

According to one embodiment of the invention, the substrates are conductive and therefore serve as electrodes for addressing the material. Germanium is an example of a conducting substrate material. If non-conducting substrates (such as sodium chloride) are used, the infrared modulating material can be addressed by placing an electric field across the films by means of electrodes 16 deposited or painted onto the substrate. At least one, and preferbly both, of the electrodes should be transparent to infrared radiation. An example of a suitable electrode is a thin film of platinum, which absorbs approximately 50% of incident infrared radiation.

Figure 2A:
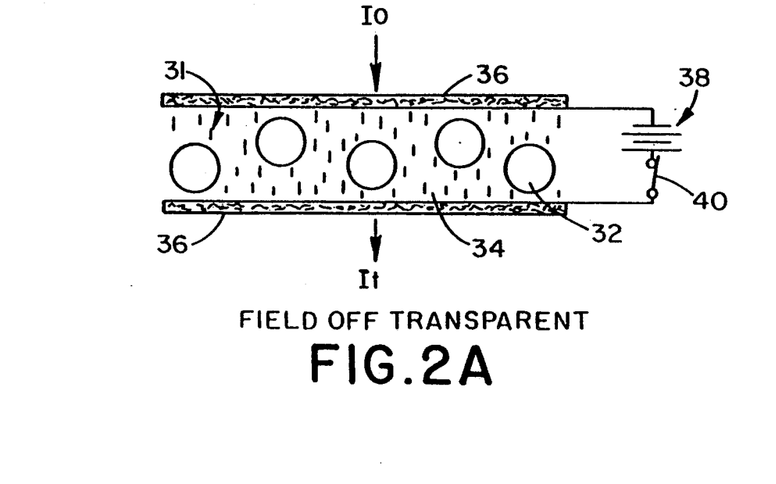
FIG. 2A is a fragmentary, schematic view in cross-section of an infrared modulating material embodying the present invention comprising solid particles dispersed in a layer of liquid crystal, shown in a field-off state.
Figures 3A, 4A:
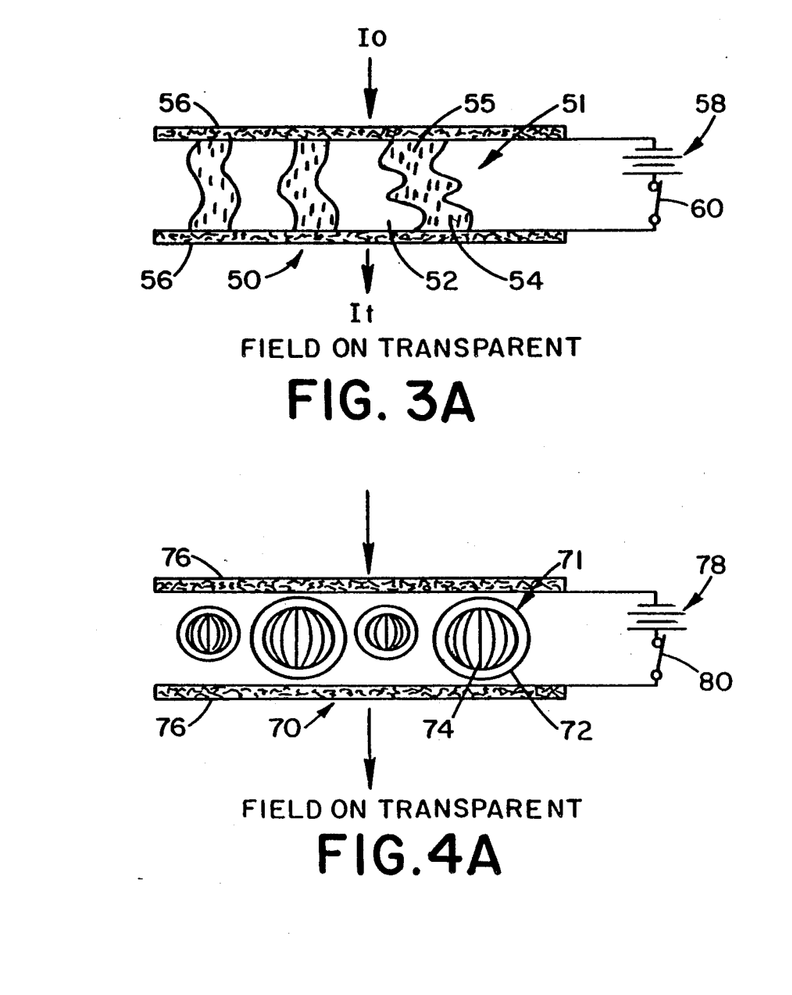
FIG. 3A is a fragmentary, schematic cross-section of an infrared modulating material embodying the present invention and comprising liquid crystal imbibed in a microporous solid, shown in a field-on state.
FIG. 4A is a fragmentary, schematic cross-section of an infrared modulating material embodying the present invention comprising droplets of liquid crystal encapsulated in polymer capsules, shown in a field-on state.

FIG. 2A illustrates another electro-optic device 30 incorporating another infrared modulating material 31 embodying the present invention. The material 31 comprises of a dispersion of solid particles 32 transparent to infrared radiation dispersed in a layer of liquid crystal 34. The particles 32 have a feature size, i.e. particle size, in the range of infrared radiation to be modulated.

The dispersion of solid-particles and liquid crystal 31 is sandwiched between substrate-supported electrodes 36 both of which are transparent in the wavelength range of infrared radiation to be modulated. In a field-on state, a power supply 38 is coupled to the electrodes 36 by a closed switch 40. As the electrodes 36 charge, an electric field is applied across the dispersion 31. When a liquid crystal with positive dielectric anisotropy is used in the layer 34, the field generated by the electrodes 36 aligns the optical axis of the liquid crystal layer 34 parallel to the field so that the material 31 transmits incident radiation $I_o$ without significant scattering.

Figure 2B:
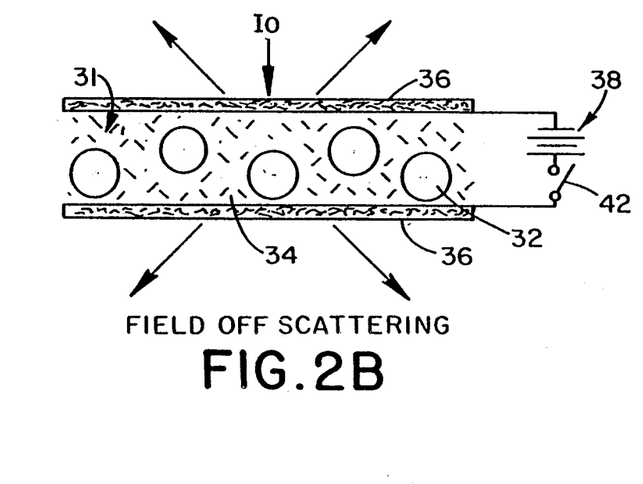
FIG. 2B is a fragmentary, schematic view in cross-section of the liquid crystal infrared modulating material illustrated in FIG. 2A shown in a field-off state.

FIG. 2B shows the same device 30 in a field-off state when the power supply 38 is decoupled from the elecrodes 36 by an open switch 42. Absent an external field, the liquid crystal molecules in the layer 34 are randomly aligned so that incident radiation is scattered at the interfaces between the liquid crystal and the particles.

The solid particles should be transmissive to infrared radiation in the wavelength range of interest. More particularly, the solid particle should be transparent in the 2.5-5 $\mu$m, 8-14 $\mu$m or 15-30 $\mu$m region. Suitable materials for the solid particles include alkyl or alkaline earth halide grains such as sodium chloride, calcium chloride, potassium chloride, potassium bromide and cesium chloride, and polymer beads such as polyvinyl pyrrolidone, polymethylmethacrylate and polyetrafluoroethylene. For example, alkyl halides and alkaline earth halides are transparent to infrared radiation in the 2.5-5 $\mu$m and 8-14 $\mu$m regions.

A preferred liquid crystal for use in the embodiment of FIGS. 2A and 2B is E7 nematic liquid crystal.

For best results in obtaining the forward scattering of infrared radiation in the field-off state, the feature size of the solid particles, i.e. the diameters or a characteristic dimension of the grains or beads, should be on the order of the wavelength range of infrared radiation to be modulated. Preferably, the sizes of the grains or beads will be on the order of 2.5-5 $\mu$m, 8-14 $\mu$m or 15-30 $\mu$m, depending on the range of radiation to be modulated.

In order for infrared radiation to be transmitted in the field-on state, the indices of refraction of the solid particles, $n_p$, should be matched to the ordinary index of refraction, $n_o$, of the liquid crystal in the wavelength range of infrared radiation to be modulated. For example, alkyl halides such as NaCl have indices of refraction similar to the ordinary indices of refraction of cyanobiphenyl liquid crystals such as E7 in the infrared range.

The general procedure for preparing a solid particle infrared modulating device consists of making a paste by mixing the liquid crystal with ground particles of the medium having a diameter or characteristic length within the range of infrared radiation to be modulated. The paste is sandwiched between infrared transparent substrates. The modulating material is addressed by placing an electric field across the film via either a conductive substrate or electrodes 36 (e.g., platinum electrodes) deposited or painted onto a non-conductive substrate.

FIG. 3A illustrates another electro-optic device 50 incorporating yet another infrared modulating material 51 embodying the present invention. The material 51 comprises a dispersion formed by imbibing liquid crystal 54 into pores 55 of a porous solid 52 transparent to infrared radiation. The micropore size, i.e., the feature size, is on the order of the wavelength range of the infrared radiation to be modulated.

The porous solid 52 is sandwiched between substrates which are either conductive themselves or carry electrodes 56 which are transparent in the wavelength range of infrared radiation to be modulated. In a field-on state, a power supply 58 is coupled to the electrodes 56 by a closed switch 60. As the electrodes 56 charge, an electric field is applied across the material 51. When a liquid crystal with positive dielectric anisotropy is imbibed into the pores 55, the field generated by the electrodes 56 aligns the optical axes of the liquid crystal 54 parallel to the field so that the material 51 transmits incident radiation $I_o$ without significant scattering.

Figure 3B:
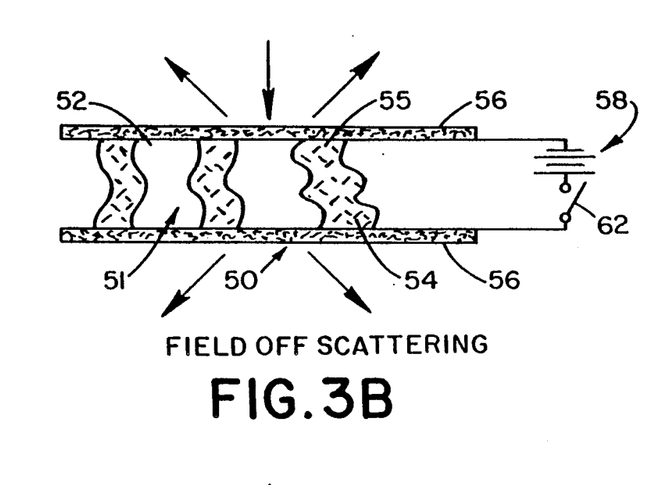
FIG. 3B is a fragmentary, schematic cross-section of the liquid crystal infrared modulating material illustrated in FIG. 3A shown in a field-off state.
Figure 4B:
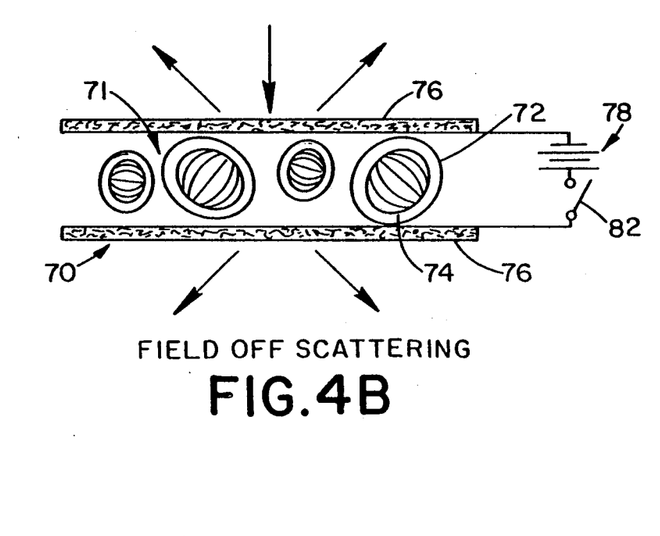
FIG. 4B is a fragmentary, schematic cross-section of the liquid crystal infrared modulating material illustrated in FIG. 4A in a field OFF state.

FIG. 3B shows the same device 50 in a field-off state when the power supply 58 is decoupled from the electrodes 56 by an open switch 62. Absent an external field, the liquid crystal directors in the material 51 are randomly aligned and incident radiation is scattered.

According to a preferred embodiment, the feature size of the porous solid 52, i.e. the diameters of the pores 55, should be on the order of the wavelength range of infrared radiation to be modulated. Preferably, the diameters of the pores 55 will be on the order of 2.5-5 $\mu$m, 8-14 $\mu$m or 15-30 $\mu$m, depending on the range of radiation to be modulated. One example of a suitable porous solid 52 is a Millipore filter, which is commercially available with pore diameters ranging from 1 to 15 $\mu$m. A suitable polymer for use in forming a porous solid 52 for use in an infrared modulating material is polytetrafluoroethylene.

According to one technique, the liquid crystal 54 is imbibed into the porous solid 52 by covering the surface of the solid 52 with the liquid crystal and allowing the pores 55 to fill by capillary action. Alternatively, the porous solid 52 is placed on a glass frit and covered with liquid crystal. A pressure differential is applied across the glass frit to draw the liquid crystal 54 down into the pores 55.

FIG. 4A illustrates another electro-optic device 70 incorporating still another infrared modulating material 71 embodying the present invention. The material 71 consists of a dispersion formed by encapsulating liquid crystal 74 in polymer capsules 72 formed from an aqueous emulsion of the liquid crystal with the polymer. According to a preferred technique for encapsulation, the aqueous emulsion of liquid crystal and polymer is spread onto a substrate and allowed to harden to form a film of modulating material. The feature size, i.e., the diameters of the encapsulated droplets 74, is on the order of the wavelength range of the infrared radiation to be modulated.

The film of encapsulated liquid crystal droplets 71 is sandwiched between electrodes 76 both of which are transparent in the wavelength range of infrared radiation to be modulated. In a field-on state, a power supply 78 is coupled to the electrodes 76 by a closed switch 80. As the electrodes 76 charge, an electric field is applied across the material 71. When the encapsulated liquid crystal 74 has positive dielectric anisotropy, the field generated by the electrodes 76 aligns the optical axes of the encapsulated droplets 74 parallel to the field so that the material transmits incident radiation $I_o$ without significant scattering.

FIG. 4B shows the same device 70 in a field-off state when the power supply 78 is decoupled from the electrodes 76 by an open switch 82. Absent an external field, the optical axes of the liquid crystal droplets 74 are randomly aligned and incident radiation is scattered.

One suitable emulsion for forming an infrared modulating material is an aqueous emulsion of E7 liquid crystal with polyvinyl alcohol.

Preferred embodiments of the invention are further illustrated and described by the following specific examples.

EXAMPLE 1-10

Field responsive, infrared modulating devices were prepared by phase separation in which the droplet size was varied depending upon the rate of cooling from the isotropic melt. PDLC films of E7 and polyvinyl pyrrolidone, PVP, and E7 and polymethylmethacrylate, PMMA, in ratios of 4 to 1 were formed. 10 μm thick films were formed from solutions of the E7 and resin in a chloroform solvent cast on NaCl plates with a transparent conductive platinum coating. Once the PDLC films were formed, the liquid crystal droplet sizes were altered by warming the films to form homogeneous solutions, followed by cooling through the phase transition temperature at controlled rates. Table I lists the droplet size as a function of cooling rate. The droplet sizes were measured using an optical microscope.

TABLE I

DROPLET SIZE AS A FUNCTION OF COOLING RATE FOR E7/PVP AND E7/PMMA PDLC FILMS in a 4-1 ratio.

| Cooling Rate | Example | E7/PVP Droplet Diameter | Example | E7/PMMA Droplet Diameter |
|---|---|---|---|---|
| >>10° C./min. | 1 | <<5 mm | 6 | <<5 mm |
| 4° C./min. | 2 | 10–15 mm. | 7 | 3–5 mm |
| 2° C./min. | 3 | 15–25 mm. | 8 | 5–10 mm |
| 1° C./min. | 4 | 20–30 mm. | 9 | 10–15 mm |
| 0.5° C./min. | 5 | 25–40 mm. | 10 | 15–25 mm |

Figure 5:
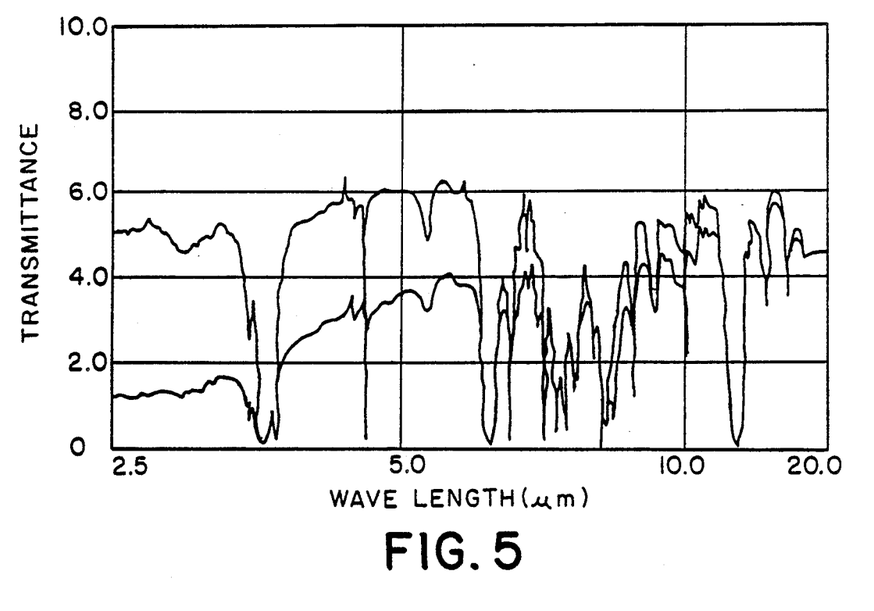
FIG. 5 is a graph showing percent IR transmission as a function of wavelength of incident radiation for an infrared modulating material comprising droplets of E7 nematic liquid crystal with diameters 5 $\mu$m–10 $\mu$m dispersed in a matrix of polyvinyl pyrrolidone in the field-on and field-off states.
Figure 6:
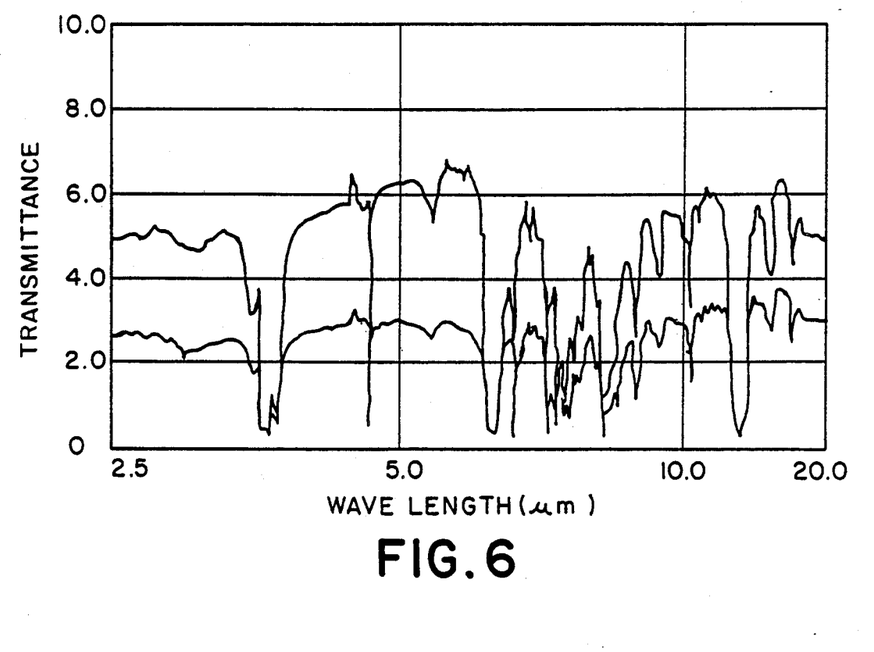
FIG. 6 is a graph showing percent IR transmission as a function of wavelength of incident radiation for an infrared modulating material comprising droplets of E7 nematic liquid crystal with diameters 15 $\mu$m–25 $\mu$m dispersed in a matrix of polyvinyl pyrrolidone in the field-on and field-off states.

FIG. 5 is the percent IR transmission in the field-on and field-off states as a function of wavelength obtained from a PDLC infrared modulating device composed of E7 and PVP in which the droplet diameter was 5 μm–10 μm. FIG. 6 is the IR transmission in the ON and OFF states obtained from a PDLC of E7 and PVP in which the droplet diameter was 15–25 μm. The upper curves 84, 88 represent the field-on IR transmission of the materials. The lower curves 86, 90 were obtained in the absence of an external field.

A comparison of two transmissions in the field-off state indicates that the scattering efficiency is highly dependent on droplet diameter and wavelength. In the OFF state the scattering is greater for the film containing a droplet diameter of much less than 5 μm in the shorter 2.5–5 μm region, whereas the scattering is greater for the PDLC film having droplet diameters of 15–25 μm in the 8–14 μm region. Maximum scattering occurred when the droplet size was on the order of the wavelength of radiation being modulated. This shows how the films can be tailored for use in a particular wavelength region.

EXAMPLE 11

Figure 7:
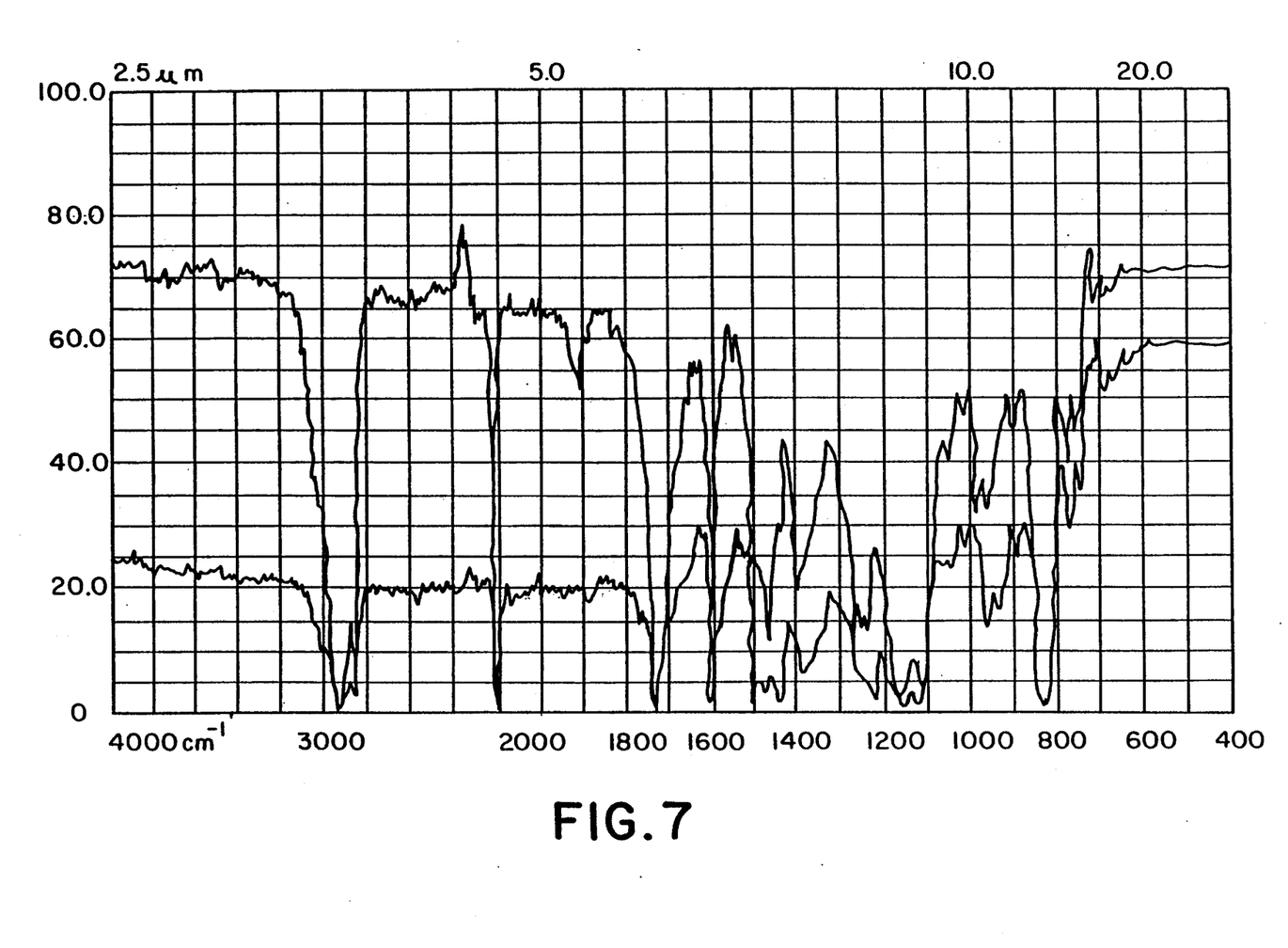
FIG. 7 is a graph showing percent IR transmission as a function of wavelength of incident radiation for an infrared modulating material comprising droplets of E7 nematic liquid crystal with diameters of 20 $\mu$m–30 $\mu$m dispersed in a matrix of polymethylmethacrylate) in the field-on and field-off states.

A field responsive, infrared modulating device was constructed utilizing a PDLC film. The PDLC film was prepared by cooling a solution of E7 in a thermoplastic melt of polymethylmethacrylate, PMMA, in a ration of 4:1 E7 to PMMA. Large liquid crystal droplets having a diameter of 20–30 μm were formed by cooling from 75° C. to 21° C. in about 12 hours. A 10 μm thick film of the PDLC was sandwiched between NaCl substrates coated with a platinum conducting electrode. FIG. 7 shows IR transmission spectra of the device in the field-on state, 92, and field-off state, 94, measured with a Sargent-Welch 3-200 IR Spectrophotometer. There was no significant absorption at 2.5–3.5 μm, 4.0–6.0 μm, 9.5–10.5 μm, or 8–14 μm.

EXAMPLE 12

A field responsive, infrared modulating device was constructed. In this example, polyvinyl pyrrolidone, PVP, powder having a particle size of 10–30 μm was added to enough E7 to just wet the powder. The paste was sandwiched between germanium substrates. The resulting film scattered infrared radiation in the 2 to 14 μm range. When voltage of 100 volts was applied to the material, the material switched from infrared scattering to a transparent state. Upon removal of the voltage the material returned to the opaque, infrared scattering state.

Figure 8:
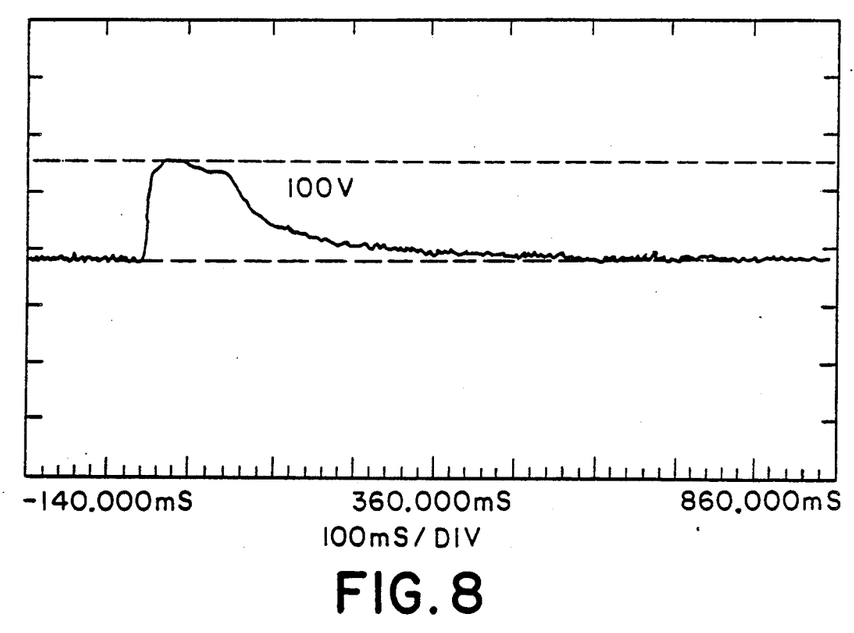
FIG. 8 is a graph showing material response as a function of time for an infrared modulating material comprising a powder of polyvinyl pyrrolidone with particle diameters of 20 $\mu$m-30 $\mu$m dispersed in a layer of E7 nematic liquid crystal subject to 100 volts for 100 milliseconds. The voltage was applied at the 0 millisecond point on the abscissa and removed at the 100 millisecond point on the abscissa.

FIG. 8 illustrates the response time when 100 volts was applied to the film for a period of 100 milliseconds. The material switched from an infrared opaque to an infrared transmissive state within 20 milliseconds, while the switching time from infrared transmissive to infrared opaque was longer.

EXAMPLE 13

A field response, infrared modulating device was constructed. To polymethylmethacrylate, PMMA, powder having a feature size of approximately 25 μm and a molecular weight of 12,000 was added enough E7 to form a paste. The paste was sandwiched between germanium electrodes with an anti-reflective coating. The application of 100 volts to the cell switched the film from infrared scattering to clear in the 2-14 μm region.

Figure 9:
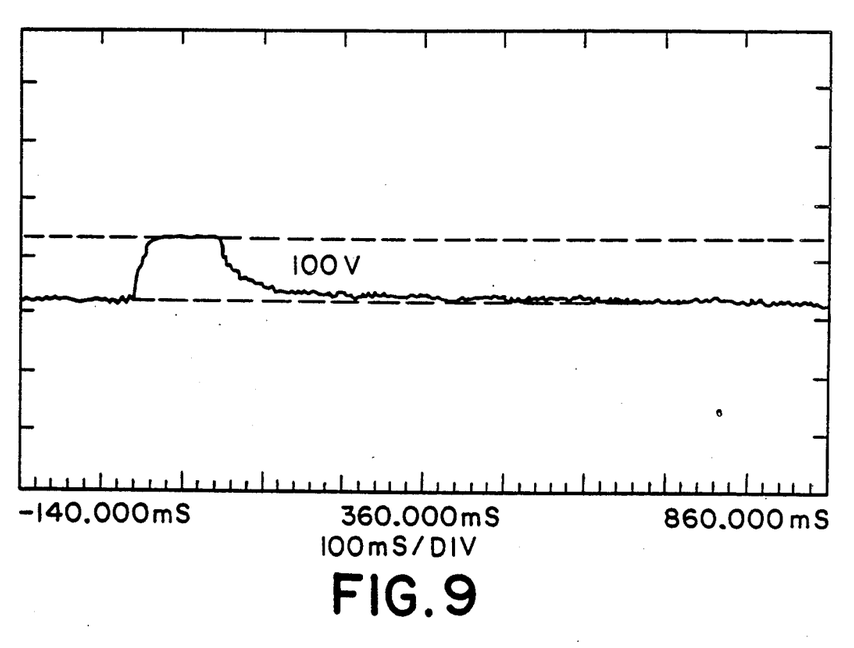
FIG. 9 is a graph showing material response as a function of time for an infrared modulating material comprising a powder of polymethylmethacrylate with a particle diameter of 25 $\mu$m dispersed in a layer of E7 nematic liquid crystal subject to 100 volts for 100 milliseconds. The voltage was applied at the 0 millisecond point on the abscissa and removed at the 100 millisecond point on the abscissa.

As indicated in FIG. 9, which illustrates the response time of the film when 100 volts was applied across the material for 100 milliseconds, the film switched from opaque to infrared transmissive in approximately 20 milliseconds or less after the 100 volt field was applied while the switching time from infrared transmissive to opaque after the field was removed was slower.

Variations and modifications of the invention will be apparent to those skilled in the art from the above detailed description. Therefore, it is to be understood that, within the scope of the appended claims, the invention can be practiced otherwise than as specifically shown and described.

We claim:

1. An infrared modulating material comprising a first phase dispersed in a second phase, one of said first and second phases comprising a liquid crystal phase and the other of said phases comprising a medium phase;
   the liquid crystal and medium phases each absorbing no more than 50% of incident radiation in a range of infrared wavelengths;
   the liquid crystal phase having an ordinary index of refraction measured in a range of infrared wavelengths which matches an index of refraction of the medium phase measured in said range of infrared wavelengths; and
   the first phase having a feature size of the order of said range of infrared wavelengths and the material having sufficient thickness so that the material scatters infrared radiation in the absence of an external electric or magnetic field.

2. A material according to claim 1 wherein said range of infrared wavelengths includes the range 2.5-5 microns.

3. A material according to claim 1 wherein said range of infrared wavelengths includes the range 8 μm-14 μm.

4. A material according to claim 1 wherein said range of infrared wavelengths includes the range 15 μm-30 μm.

5. A material according to claim 1 wherein the liquid crystal phase is nematic and has positive dielectric anisotropy.

6. A material according to claim 1 wherein the liquid crystal phase comprises a cyanobiphenyl.

7. A material according to claim 1 wherein the liquid crystal phase comprises a cyclohexane derivative.

8. A material according to claim 1 wherein the liquid crystal phase comprises a cyanotolane.

9. A material according to claim 1 wherein the liquid crystal phase is perdeuterated.

10. A material according to claim 1 wherein the second phase comprises a polymer matrix and the first phase comprises droplets of liquid crystal dispersed in the matrix; and wherein said feature size is the diameters of the droplets.

11. A material according to claim 10 wherein the polymer matrix comprises a component selected from the group consisting of polyvinyl pyrrolidone and polymethylmethacrylate.

12. A material according to claim 1 wherein the second phase comprises the liquid crystal phase and the first phase comprises a plurality of solid particles, and wherein said feature size is the diameters of the solid particles.

13. A material according to claim 12 wherein the particles comprise a component selected from the group consisting of a polymer and an alkyl halide.

14. A material according to claim 1 wherein the second phase is a porous solid and the first phase comprises a liquid crystal phase trapped in pores in the solid, and the feature size is the widths of pores in the porous solid.

15. An infrared shutter comprising:
   an infrared modulating material comprising a first phase dispersed in a second phase, one of said first and second phases comprising a liquid crystal phase and the other of said phases comprising a medium phase;
   the liquid crystal and medium phases each absorbing no more than 50% of incident radiation in a range of infrared wavelengths;
   the liquid crystal phase having an ordinary index of refraction measured in said range of infrared wavelengths which matches an index of refraction of the medium phase measured in said range of infrared wavelengths; and
   the first phase having a feature size of the order of said range of infrared wavelengths and the material having sufficient thickness so that the material scatters infrared radiation in the absence of an external electric or magnetic field;
   an electrode for applying an external electric field across the material for switching the material between infrared scattering and infrared transmissive conditions; and
   a power supply electrically coupled to the electrode for generating and transferring to the electrode electric power for applying such an electric field.

16. A process for manufacturing an infrared modulating material for modulating a selected wavelength range of the infrared spectrum comprising the steps of:
   choosing a liquid crystal which absorbs no more than 50% of incident radiation in the selected wavelength range in a thickness effective for the scattering of incident radiation in the selected range;
   choosing a medium which absorbs no more than 50% of such incident radiation in the selected wavelength range in a thickness effective for the scattering of incident radiation in the selected range and which has an index of refraction for such incident radiation in the selected wavelength range matched to an ordinary index of refraction of the liquid crystal for such incident radiation in the selected wavelength range; and
   forming a dispersion of a phase consisting essentially of said liquid crystal and a phase consisting essentially of said medium such that one of said phases has a feature size of the order of the selected wavelength range.

17. A process according to claim 16 wherein one of the choosing steps additionally includes choosing one of said liquid crystal and medium such that said one of said liquid crystal and medium absorbs in bulk no more than 20% of such incident radiation in the selected wavelength range.

18. A process according to claim 16 wherein the medium comprises a resin and the forming step includes forming a solution of the resin and the liquid crystal and solidifying the resin to form droplets of said liquid crystal phase dispersed in polymer.

19. A process according to claim 18 wherein the step of forming a solution of the resin and liquid crystal includes forming a first solution of the liquid crystal and the resin in a solvent and the step of solidifying the resin includes removing the solvent; and wherein the method includes the additional step of reheating the solidified material to form a second single-phase solution of liquid crystal and resin, and cooling the second single-phase solution at a rate selected to obtain droplets having a diameter of the order of the selected wavelength range.

20. A process according to claim 18 wherein the step of solidifying the resin includes cooling the solution at a rate selected to obtain droplets having diameters of the order of the selected wavelength range.

21. A process according to claim 18 herein the step of forming a solution of the resin and liquid crystal includes forming a solution of the liquid crystal and the resin with a curing agent for inducing cross-linking of the resin during the solidifying step.

22. A process according to claim 18 including the additional step of mechanically stressing the solidified resin to deform the droplets.

23. A process according to claim 16 wherein the medium comprises a resin and the forming step comprises forming an emulsion of the liquid crystal with the resin and solidifying at least a portion of the resin to encapsulate droplets of the liquid crystal in polymer, said droplets having diameters of the order of the selected wavelength range.

24. A process according to claim 16 wherein the medium comprises solid particles having diameters of the order of the selected wavelength range and the forming step comprises dispersing the solid particles in a layer of the liquid crystal phase confined by a structure comprising a solid transparent to infrared radiation in the selected wavelength range.

25. A process according to claim 16 wherein the medium phase comprises a porous solid having pores with diameters on the order of the selected wavelength range and the forming step comprises imbibing the liquid crystal phase into pores in the porous solid.

* * * * *

UNITED STATES PATENT AND TRADEMARK OFFICE
CERTIFICATE OF CORRECTION

PATENT NO.   : 5,093,735
DATED        : March 3, 1992
INVENTOR(S)  : J. William Doane and John L. West It is certified that error appears in the above-identified patent and that said Letters Patent is hereby corrected as shown below:

Column 1, line 5, insert the following:

---The United States government has a paid-up license in this invention and may have the right in limited circumstances to require the patent owner to license others on reasonable terms as provided for by the terms of contract DAAB07-88-C-F421, awarded by Advanced Research Projects Agency.---

Signed and Sealed this

Eighth Day of December, 1998

*Attest:*

BRUCE LEHMAN

*Attesting Officer*  Commissioner of Patents and Trademarks